US012804239B2

(12) United States Patent
Giladi

(10) Patent No.: US 12,804,239 B2
(45) Date of Patent: Nov. 17, 2026

(54) VIDEO CONTENT PROCESSING SYSTEMS AND METHODS

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 627 days.

(21) Appl. No.: 17/391,127

(22) Filed: Aug. 2, 2021

(65) Prior Publication Data

US 2022/0038789 A1 Feb. 3, 2022

Related U.S. Application Data

(60) Provisional application No. 63/060,585, filed on Aug. 3, 2020.

(51) Int. Cl.

| | |
|---|---|
| ***H04N 21/6437*** | (2011.01) |
| ***H04L 29/06*** | (2006.01) |
| ***H04L 65/65*** | (2022.01) |
| ***H04N 21/6371*** | (2011.01) |
| ***H04N 21/845*** | (2011.01) |

(52) U.S. Cl.

CPC ......... *H04N 21/6437* (2013.01); *H04L 65/65* (2022.05); *H04N 21/6371* (2013.01); *H04N 21/8456* (2013.01)

(58) Field of Classification Search

CPC ........... H04N 21/6437; H04N 21/6371; H04N 21/8456; H04L 65/65

See application file for complete search history.

(56) References Cited

U.S. PATENT DOCUMENTS

| | | | | |
|---|---|---|---|---|
| 8,392,748 | B2 * | 3/2013 | Bocharov | H04L 67/563 714/4.11 |
| 8,943,534 | B2 * | 1/2015 | Reisner | H04N 21/23424 725/32 |
| 9,549,203 | B2 * | 1/2017 | Hughes | H04N 21/8586 |
| 9,699,229 | B2 * | 7/2017 | Stockhammer | H04N 21/6125 |
| 9,729,830 | B2 * | 8/2017 | May, Jr. | H04N 21/8543 |
| 9,794,604 | B2 * | 10/2017 | Ohno | H04N 21/8456 |
| 9,871,839 | B2 * | 1/2018 | Kim | H04L 65/611 |
| 9,936,040 | B2 * | 4/2018 | Dakhane | H04L 67/568 |
| 10,841,353 | B2 * | 11/2020 | Phillips | H04N 21/4825 |
| 11,019,409 | B2 * | 5/2021 | Lohmar | H04L 65/611 |
| 11,146,852 | B2 * | 10/2021 | Stockhammer | H04N 21/8456 |

(Continued)

*Primary Examiner* — Nazia Naoreen
(74) *Attorney, Agent, or Firm* — BakerHostetler

(57) ABSTRACT

Methods and systems for managing and transmitting video content are disclosed. As an example, encoders and segmenters forming segment generators, may, in the absence of a content segment, send a missing content segment message to an origin device. The origin device may request the missing segment from a second, redundant origin device that may be co-located with or separate from the originating origin device. The second origin device may send the missing content segment to the originating origin device, which may forward the missing segment to an output device such as a video player or any other device. In the event that the requested segment's start time is different from the start time in the missing content segment message, the origin device may send the start time to the segment generator.

19 Claims, 10 Drawing Sheets

(56) References Cited

U.S. PATENT DOCUMENTS

| | | | | |
|---|---|---|---|---|
| 2007/0056002 | A1 | 3/2007 | Ganesan et al. | |
| 2014/0329878 | A1 | 11/2014 | Feinstein et al. | |
| 2018/0316740 | A1 * | 11/2018 | Stockhammer .... | H04N 21/8456 |
| 2019/0081862 | A1 * | 3/2019 | Lockhart ............. | H04L 41/0889 |
| 2020/0065191 | A1 * | 2/2020 | Zhou ................... | G06F 11/1662 |

* cited by examiner

VIDEO CONTENT PROCESSING SYSTEMS AND METHODS

CROSS REFERENCE TO RELATED APPLICATIONS

This application claims benefit under 35 U.S.C. § 119(e) of Provisional U.S. Patent Application No. 63/060,585, filed Aug. 3, 2020, the contents of which is incorporated herein by reference in its entirety.

BACKGROUND

Traditionally, the interface between a transcoder (entity outputting encoded media content) and a packager (entity outputting segments and manifests) may be MPEG-2 TS over UDP (Universal Datagram Protocol) or reliable UDP-based protocols such as SRT. Segmented ingest over HTTP was recently standardized by DASH-IF. The DASH-IF Interface 1 allows ingest of CMAF ("Common Media Application Format" described in ISO/IEC 23000-19:2020) segments. A transcoder may output segments to a packager using HTTP POST, while the packager may generate the manifests and coordinate output with other redundant packagers. But the traditional interfacing between the transcoder and packager, as well as related communications, lack consistent processing methods in the event of the absence of content segments, whether temporary or longer term. These and other shortcomings of the prior art are addressed by the present disclosure.

SUMMARY

Methods and systems for managing content are disclosed. Encoders and segmenters may be used to form segment generators that, in the event of an absent content segment, may send a missing content segment message to an origin device, where the message may include a start time for the segment and a duration. The origin device may request the missing segment from a second, redundant origin device that may be co-located with or separate from the originating origin device. The second origin device may send the missing content segment to the originating origin device, which may forward the missing segment to an output device. If the requested segment's start time is different from the start time in the missing content segment message, the origin device may send the start time to the segment generator so that it may be taken into account while encoding or segmenting additional video content. Additionally, segment identifiers (such as segment sequence numbers) may be embedded in segments to facilitate these and other communications among geo-redundant origin devices and/or segment generators.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure

BRIEF DESCRIPTION OF THE DRAWINGS

The following drawings show generally, by way of example, but not by way of limitation, various examples discussed in the present disclosure. In the drawings.

DETAILED DESCRIPTION

A content network may be configured to facilitate transmission of content from a content provider to an encoder, to a segmenter, to an origin device (e.g., an origin server), and to an output device, such as a video content player, other video output device, and audio content player, or other audio output device. Such content may be any type of media such as video, audio, closed captioning, subtitles, other text, still images, thumbnails, as well as other associated metadata such as SCTE 35 messages, video quality metrics, etc., and the like. Redundant and geographically distributed components such as multiple segmenters and origin devices (such as origin servers) may be used to maintain service in the event of lost communications and outage. For example, redundant origin devices may be aligned (e.g., synchronized) with each other relative to a particular content asset or time, as other tiers of components in the network come online, go offline, and come back online.

Figure 1:
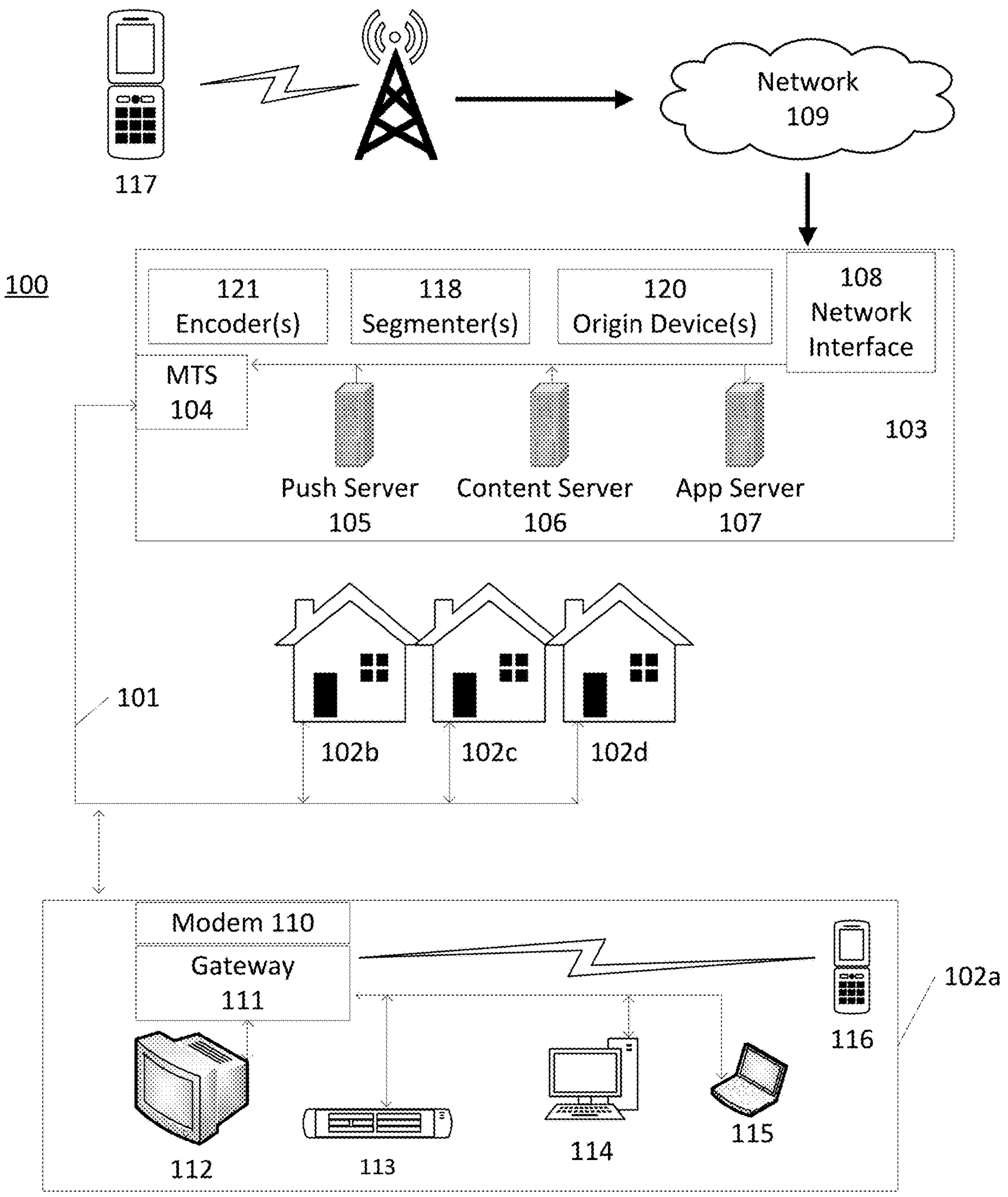
FIG. 1 shows a block diagram of an example network.

FIG. 1 illustrates an example content (e.g., data, media, information, services, etc.) delivery network 100 on which many of the various features described herein may be implemented. The network 100 may be any type of information distribution network, such as satellite, telephone, cellular, wired or wireless, etc. One example may be an optical fiber network, a coaxial cable network or a hybrid fiber/coax (HFC) distribution network, or a wireless network using technologies such as 5G or WiFi or any other wired or wireless network. Such networks 100 use a series of interconnected communication lines 101 (e.g., coaxial cables, optical fibers, wireless, etc.) to connect multiple premises 102*a-d* (e.g., businesses, homes, consumer dwellings, etc.) to a processing environment such as a video processing environment 103 (e.g., a headend, a processing facility, etc.). Of course, the processing environment may alternatively be an audio processing environment and even though video processing is described with respect to FIG. 1 and other figures herein, the disclosure is also applicable to audio content. The processing environment is any environment for processing any content, which includes any media, such as video, audio, closed captioning, subtitles, other text, still images, thumbnails, as well as other associated metadata such as SCTE 35 messages, video quality metrics, etc., and the like.

The video processing environment 103 may transmit downstream information signals onto the lines 101, and each premises 102*a-d* may have a receiver used to receive and process those signals. There may be one or more lines 101 originating from the video processing environment 103, and the lines 101 may be split a number of times to distribute the signal to various premises 102*a-d* in the vicinity (which may be many miles) of the video processing environment 103. The lines 101 may include components not illustrated, such as splitters, filters, amplifiers, etc., to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single video processing environment 103 to reach even farther with its network of lines 101 than before.

The various premises 102*a-d* may be connected (through wiring and/or wireless connections) to one another, forming a local premises access network operationally distinct from another local access network. The connected homes forming a local premises access network may be located near one another, such as neighboring townhomes, individual apartments in a downtown high-rise building, or the like. For example, a local premises access network may include the various premises 102*a-d*. Another group of homes (not shown) may form a separate local premises access network. The local premises access network of the various premises 102*a-d* may be identifiable from the separate local premises access network. A local premises access network may also be associated with a particular region (e.g., city, county, geographic area etc.). In some embodiments, homes connected to a termination system (TS), such as a modem termination system (MTS), may form a local premises access network. Of course, the topology for the system may be in any arrangement, with any of the components shown in FIG. 1 located anywhere, such as on the cloud, in a stationary datacenter, in a mobile datacenter, such as on a truck, for example. For example, an encoder 121 or segmenter 118 or both may be in the cloud, an encoder 121 may be in a truck/data center, and a segmenter 118 in the cloud, etc.

The video processing environment 103 may include a termination system (TS) 104, such as a cable modem termination system (CMTS) in an example of an HFC-type network, which may be a computing device configured to manage communications between devices on the network of lines 101 and backend devices such as servers 105-107 (to be discussed further below). Of course, inclusion of a termination system 104 may be optional. In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102*a-d*, and to receive upstream communications from those modems on one or more upstream frequencies. The video processing environment 103 may also include one or more network interfaces 108, which can permit the video processing environment 103 to communicate with various other external networks 109. These networks 109 may include, for example, Internet Protocol (IP) networks having Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones 117.

As noted above, the video processing environment 103 may include a variety of servers 105-107 that may be configured to perform various functions. For example, the video processing environment 103 may include a push notification server 105. The push notification server 105 may generate push notifications to deliver data and/or commands to the various premises 102*a-d* in the network (or more specifically, to the devices in the premises 102*a-d* that are configured to detect such notifications). The video processing environment 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The video processing environment 103 may also include one or more application servers 107. An application server 107 may be a computing device configured to offer any desired service, and may run various languages and operating systems. For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102*a-d*.

The video processing environment 103 may also include one or more encoders 121 that may include encoding (e.g., transcoding) functionality for processing video content (e.g., mark time codes, encode information in the stream, fragment/segment the content, etc.). The video processing environment 103 may further include segmenters 118 comprising packager functionality and the capability of segmenting the video content into segments in preparation for ultimately sending to output devices such as a video content players or other video output devices at the premises 102*a-d*. The encoders 121 and the segmenters 118 may be tightly integrated. For example, the encoding and segmenting functionality of the encoders 121 and segmenters 118, respectively, may be software modules incorporated into a single computing device or system. In addition, segmenters 118 may perform segmenting functions typically performed by prior-art packagers or as a part of prior-art packaging. In this way, with the tight integration with encoders 121, segmenters 118 may perform segmentation without calling to libraries, potentially reducing risks associated with unprotected UDP. The segmenters 118 may be HTTP clients. Furthermore, the segmenters 118 may be configured to transmit the processed and segmented content to one or more origin devices 120, which, in turn may transmit the content to the premises 102*a-d*.

The origin devices 120 may be HTTP servers, for example, receiving POST or PUT requests from segmenters 118 and GET requests from the content delivery network. For example, it is possible that origin devices 120 may receive requests directly from clients (if a network is bypassed for whatever reason). Alternatively, the origin devices 120 may be servers implementing the ROUTE Protocol or ATSC ROUTE/DASH protocol or 3GPP FLUTE, or any protocols such as UDP-based protocols, protocols that are unicast or multicast, or protocols with FEC and/or retransmissions capable of pushing segments. The key thing in this example is that we're using a reliable UDP protocol with FEC and/or retransmissions which is capable of pushing segments. The origin devices 120 additionally may be HTTP clients when, for example, requesting segments or MPDs ("Media Presentation Description") from a georedundant origin. In an aspect, redundant and distributed components such as multiple encoders 121, segmenters 118 and origin devices 120 may be used to maintain service in the event of a loss of input or a portion of the system experiences an outage. For example, redundant respective encoders 121, segmenters 118 or origin devices 120 may be aligned (e.g., synchronized) with each other relative to a particular content asset or time, as input is lost or other tiers of components in the network come online, go offline, and come back online. In this context, "synchronized" may include two identical pictures (e.g., transformations of a single captured frame) always having the same timestamp. It also may include segment boundaries starting from same timestamp.

One or more of the segmenters 118 or origin devices 120 may be configured to generate manifest file(s) (called, for example, a "media presentation description" (or MPD) in the MPEG DASH specification ISO/IEC 23009-1 or a "playlist" in HTTP Live Streaming) Alternatively, one or more segmenters 118 or origin devices 120 may be configured according to MPEG CMAF (Common Media Application Format) standard.

An example premises 102*a* may include a modem 110 (or another receiver and/or transmitter device suitable for a particular network), which may include transmitters and receivers used to communicate on the lines 101 and with the video processing environment 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the video processing environment 103 and other devices beyond the video processing environment 103. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
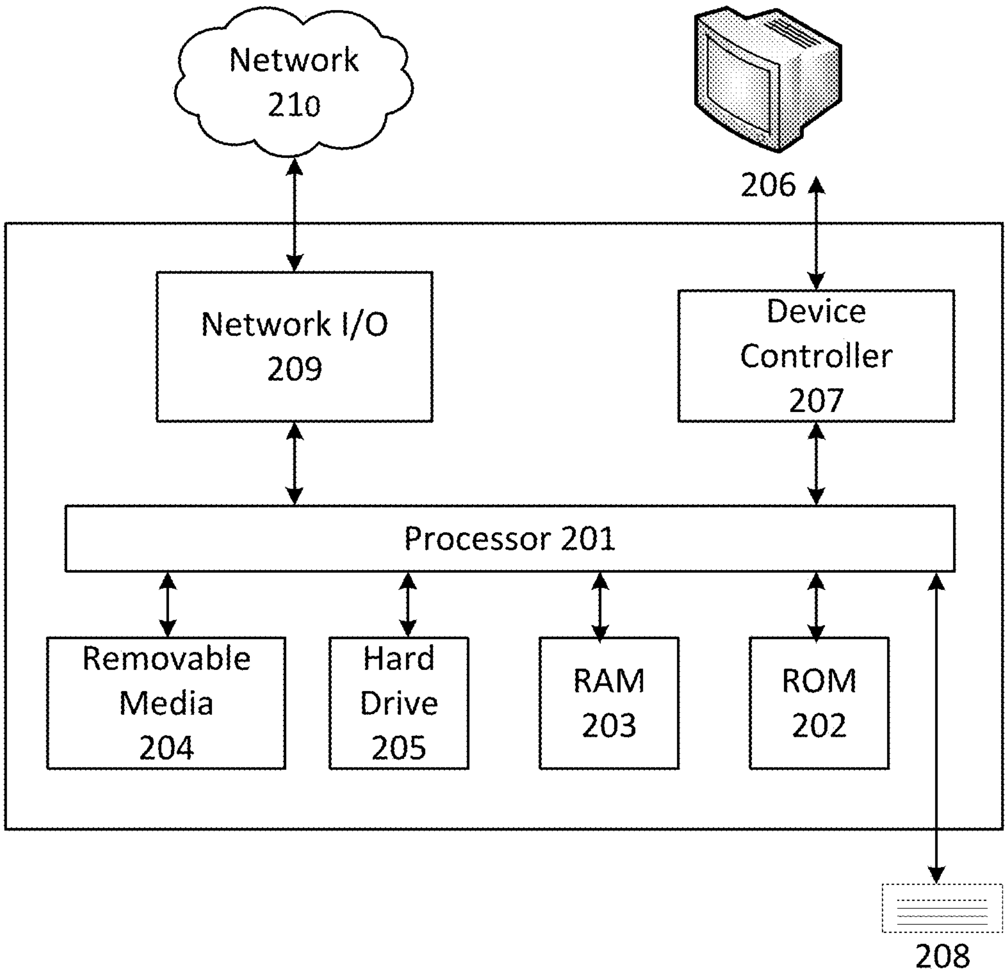
FIG. 2 shows a block diagram of an example system architecture.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor, There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc., components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may he combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed, the video processing environment (and/or audio or media processing environment) of an information distribution network may transmit information downstream to various user devices. The transmitted information may include content for consumption (e.g., playback, viewing, listening, display, storage, etc.) by a user via user equipment, such as a gateway interface device gateway interface device 111 of FIG. 1) and/or other computing device (e.g., televisions 112, additional STBs 113, personal computers 114, laptop computers 115, wireless devices 116 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

For example, such managing may include requesting, creating and handling various sessions (e.g., user sessions, multicast group sessions, cache fill sessions, quality of service sessions); managing transmission of the content (e.g., managing the establishing of transmissions providing unicast content, such as on demand, and linear content, such as multicast content); monitoring usage data of the distribution network, and/or handling requests and notifications from user equipment. As another example, managing may include managing the content discovery, content locating and content delivery processes of the distribution network. In some embodiments, the managing may be implemented using IP (Internet Protocol) including Hypertext Transfer Protocol (HTTP) over TCP or UDP for HTTP/3. But the invention is not limited to IP. For example, communication between various devices may be performed using HTTP and/or IP packets. In one example, a session manager server may locate a streaming server and/or a multicast address for a particular content item, and may notify user equipment of the streaming server and/or multicast address for the particular content item using HTTP packets. The user equipment may receive the particular content item (via a unicast signal and/or a multicast signal) by receiving HTTP packets that include fragments of the content item and metadata identifying the streaming server and/or multicast address. In some embodiments, communication between devices may use only a single protocol (e.g., only HTTP packets or IP packets). Content items may also be transmitted using the single protocol (e.g., HTTP or IP packets including fragments of content items). Details of these processes, and others, will be discussed in further detail below.

Content discovery processes may include supporting the discovery of the various content items being provided by a distribution network. For example, content discovery processes may support the discovery of content items for multicast and/or linear transmission. In some embodiments, content discovery and the various related processes may use an HTTP-based approach (e.g., communication is via HTTP and/or IP packets) that includes communication between user equipment, application servers, and other various servers of the video processing environment.

Content locating processes may include supporting the setup of various sessions and managing the resources of the information distribution network. In some embodiments, content locating processes may enforce entitlement procedures and digital rights management (DRM) licenses. Additionally, in some embodiments, content locating and the various related processes may use an IMP-based approach that includes communication between user equipment, session manager servers, and other servers of the video processing environment.

Content-delivery processes may include supporting the streaming of the content items from various servers, such as a streaming server of the video processing environment in some embodiments, content delivery processes may enable user equipment to receive multicast signals (e.g., signals directed at a plurality and/or group of user equipment) and/or receive unicast signals (e.g., signals directed at a specific user device). Additionally, in some embodiments, content streaming and the various related processes may use an HTTP-based approach that includes communication between user equipment, content servers, and other servers of the video processing environment.

Figure 3:
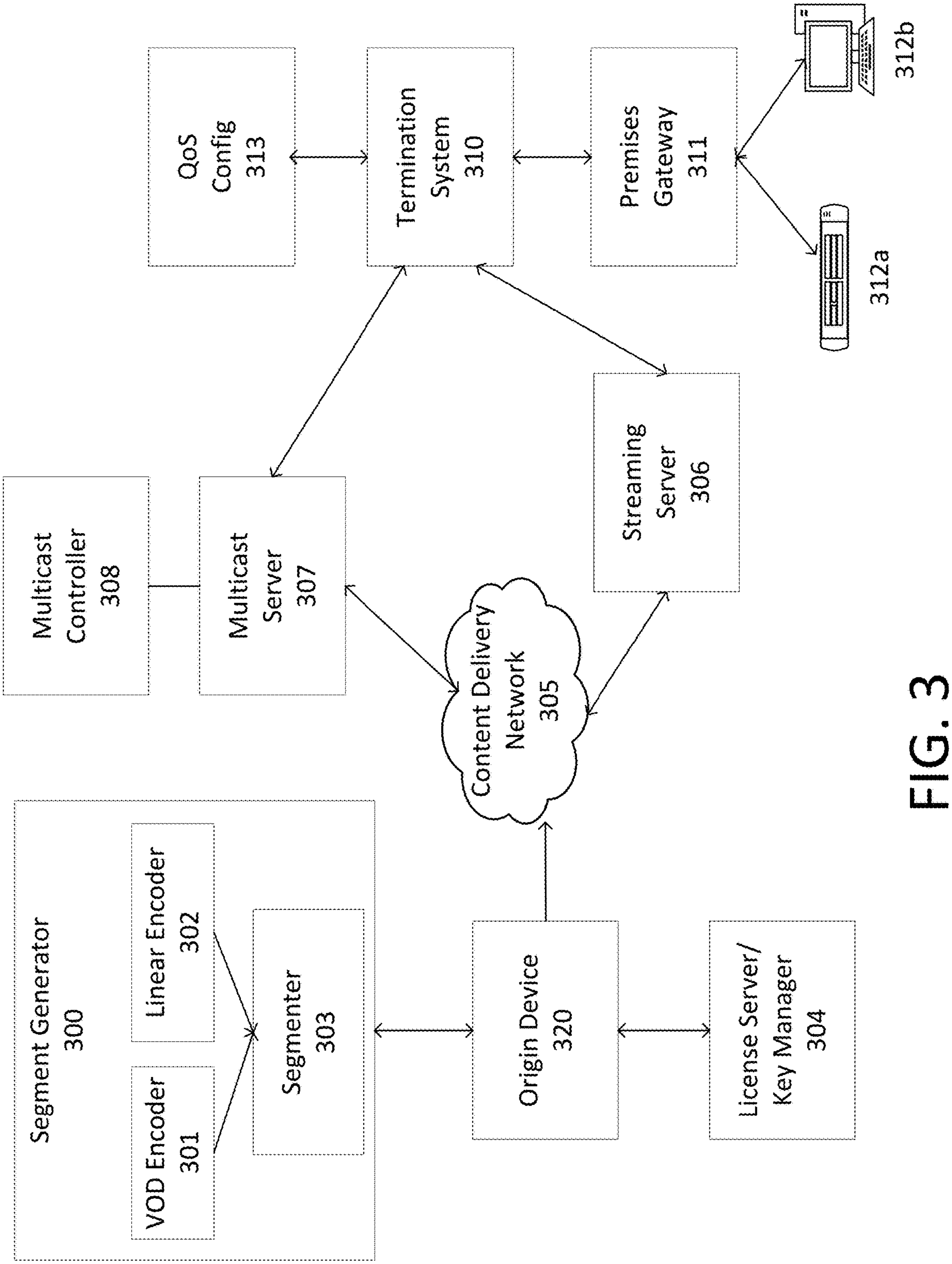
FIG. 3 shows a block diagram of an example system architecture.

FIG. 3 illustrates an example system of components that may be implemented on the network 100, and which may be used to implement various features described herein to supply various content to users. The system may include one or more sources of the content. For example, in the case of audio or video content, a segment generator 300 may be included in the network 100. A plurality of segment generators 300 may be included.

The segment generator 300 may be or may comprise one or more video on demand (VOD) content encoders 301, each of which may include an application server (such as application server 107) configured to store video content such as movies, television shows, video clips, musical videos, etc. The encoders 301 may include encoding hardware and/or software to provide content in a desired format, such as MPEG video (AVC, HEVC, VVC, etc.), audio (AAC, MP3, etc.), container (MP4, MPEG-2 TS, etc.), or streaming (DASH, etc.), or for use in HLS.

The segment generator 300 may be or may comprise one or more linear content encoders 302. The linear content encoders 302 may be similar to the VOD content encoders 301, but may further be configured to supply content according to a predetermined schedule, as opposed to on demand. For example, the NBC content service may have one or more linear encoders 302 configured to supply a video stream of NBC scheduled video programming (e.g., the nightly news) 24/7 or at the appropriate time.

The segment generator 300 may include one or more content segmenters 303. In an embodiment, one or more of the content segmenters 303 may be included in the premises gateway 311. One or more of the content segmenters 303 may be an application server configured to receive content and package it for delivery to users/user devices. This packaging may include, for example, reformatting the content (e.g., video resolution conversion, transcoding, coder/decoder conversion, audio conversion, compression altering, synchronization, etc.), and segmenting the content (e.g., a two-hour movie may be divided into a plurality of discrete time segments for delivery). In addition, packaging may include encrypting the content. The segment generator 300 in general, or the content segmenter 303 specifically may generate MPEG-2 TS segments for example or, alternatively, may generate ISO-BMFF segments. HTTP POST may be used to post discrete CMAF segments to origin device 320. To facilitate such generation, a vendor library may be compiled into the transcoder functionality of either or both the VOD encoder 301 or the linear encoder 302. Additionally, the segmenter 303 may be a Pillar-based segmenter (e.g., polyfill for MediaKind).

The origin device 320 may be based on Super8 or Pillar, for example. And the interface between the origin device 320 and the segmenter 303 may implement, for example, the DASH-IF Ingest Protocol. Alternatively or additionally, in an embodiment, the HTTP/2 may be used to avoid multiple independent TCP connections, or HTTP/3 may be used to avoid TCP altogether. In addition to receiving segmented video content from the segment generator 300 and sending such content to output devices such as video players (such as those running on set top box 312_a_ and computer 312_b_) or any other output device at premises (shown as elements 102_a-d_ in FIG. 1), the origin device further additionally generates DASH, or HLS manifests, MPDs, and the like.

The system may include a license server/key manager 304, which may be a server configured to manage content entitlement. For example, the manager 304 may manage keys for symmetric key or asymmetric (e.g., public-key) encryption, may contain encryption and/or decryption keys, and can supply those keys to content segmenter 303 for use in encrypting content for delivery. The manager 304 may also store information identifying users, and the level(s) of service to which the users are entitled, and may make determinations as to whether a particular user is actually entitled to receive a piece of requested content.

A content delivery network 305 may be any desired type of communication network, such as network 109 (FIG. 1). The content delivery network 305 may span a large area and may be used to reduce latency, traffic, and/or load on the origin device, disseminate content. The origin device 320 make content accessible. Of course, such content may include type of media such as video, audio, closed captioning, subtitles, other text, still images, thumbnails, as well as other associated metadata such as SCTE 35 messages, video quality metrics, etc., and the like, and the like.

Another example may be a multicast server 307. Like the streaming server, the multicast server 307 may also be configured to generate a stream of packaged content. However, the multicast server's stream may be a multicast stream, configured to be received by a plurality of recipient users. The multicast server 307 may operate at the direction of a multicast controller 308.

Additionally, the servers 306/307 may communicate with a termination system 310 (e.g., termination system 104) to ultimately deliver the content to a user's premises, or to a premises gateway 311 that can, in turn, supply content to various pieces of user equipment, such as a set-top box 312*a*, computer 312*b*, or any other desired display device or piece of user equipment. Other servers may be used as part of this delivery as well. For example, a quality of service (QoS) configuration manager 313 may be used to determine quality of service parameters for a given stream.

Figure 4:
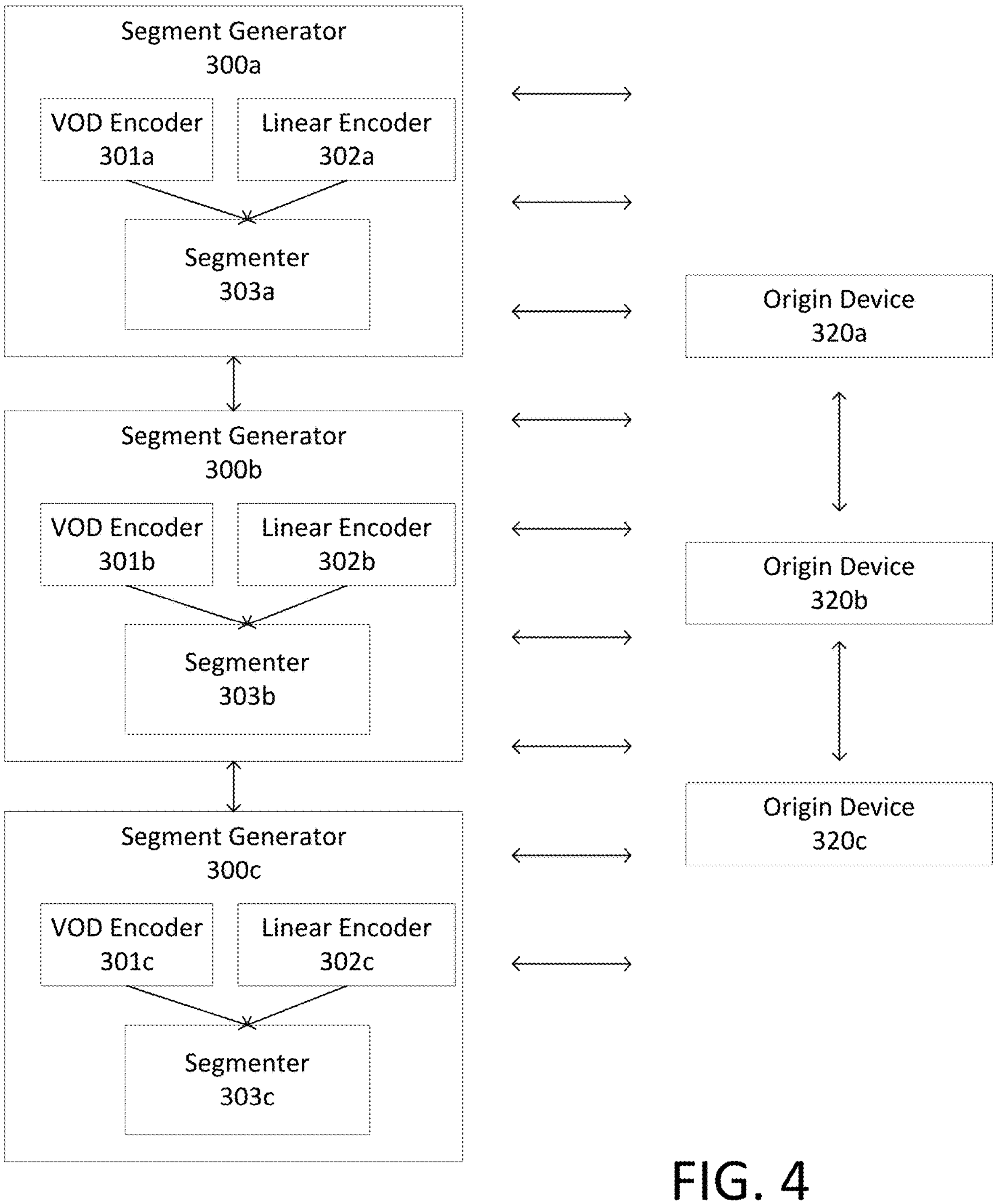
FIG. 4 shows a block diagram of an example system architecture.

FIG. 4 illustrates a plurality of redundant segment generators 300*a-c* and origin devices 320*a-c* that may be used to maintain service in the event of an outage. For example, one or more redundant segment generators 300*a-c*, VOD encoders 301*a-c*, linear encoders 302*a-c*, segmenters 303*a-c*, and/or redundant origin devices 320*a-c* may be aligned (e.g., synchronized) with each other relative to a particular content asset or time, as input is lost and/or other tiers of components in the network come online, go offline, and come back online. While FIG. 4 is described with respect to video, it is understood to also facilitate audio-content segmentation and delivery. Such content may be any type of media such as video, audio, closed captioning, subtitles, other text, still images, thumbnails, as well as other associated metadata such as SCTE 35 messages, video quality metrics, etc., and the like. In some codecs such as MPEG LC-EVC there may be separate segments for "base" (e.g. low-resolution) layer and "enhancement" (e.g. information needed to generate high-resolution video give the "base" layer. A video stream may be received by a segment generator 300*a-c*. The segment generator 300*a-c* may embed fragments of the video stream with time stamps indicating at least a segment generation time and an event time, as explained in more detail herein. The fragments of the video stream may be transmitted to each of the redundant origin devices 320*a-c*. The origin devices 320*a-c* may synchronize with each other to ensure that they have both functionally-identical manifests and segments. For example, for MPD (or HLS playlist), given two functionally identical MPDs two identical uncoordinated players in identical conditions, timing, and with identical deterministic logic may make identical decisions with regard to MPD and segment requests. Identical may not require textually identical MPDs or identical URLs. For example, a first client may fetch from a first origin device and a second client may fetch from a second origin device (or may alternatively select from the first origin service, the second origin server, or a third origin server for each segment). For media segments functional identity includes that for any integer i, i-th picture of the original (contribution stream/video camera capture/mezzanine file) i-th picture in two functionally identical segments may have the same presentation timestamp. Moreover, the earliest presentation time of two functionally identical media segments may be the same.

The origin devices 320*a-c* additionally may process the received packets including the time stamps to ensure that they are aligned with each other based at least upon the last event time stamp. Accordingly, if one or more of the origin devices 320*a-c* is unable to provide the video stream to an end-user, one of the redundant origin devices 320*a-c* may instead transmit the requested video stream to the end-user with minimal disruption to the user experience because each of the redundant origin devices 320*a-c* may be aligned to at least the last event.

If input is lost, for example, the segment generator 300*a* (or its linear encoder 302*a*, segmenter 303*a*, etc.) may recognize that the input linear video was not received for the duration of the lost input. The segment generator 302*a* (or its linear encoder 302*a*, segmenter 303*a*, etc.) may, in this circumstance, send a segment, signal or message to the origin device 320*a* that includes no video content but instead provides information about a lost segment or lost segments and their timing. For example, the segment generator 302*a* (or its linear encoder 302*a*, segmenter 303*a*, etc.) may output a 'miss' segment or a Missing Content Segment message, where the duration is the smallest value between a pre-configured target segment duration and the time from its start till the first valid frame. DASH (ISO/IEC 23009-1 4th ed) defines a Missing Content Segment ('miss') in the specification. This segment may not carry any media—it may carry timing information and optionally 'emsg' ("Event Message").

The Missing Content Segment message may include a time that input was lost, a start time for a missing segment of video content, and/or a duration of the missing segment. The origin device 320*a* may receive this Missing Content Segment message or 'miss' segment and optionally request a segment with the same start time from a redundant origin device 320*b*. Such redundant origin device 320*b* may be collocated with origin device 320*a* and on the same network as origin device 320*a*. Alternatively, redundant origin device 320*b* may be separated from origin device 320*a*—that is, the two devices may not be collocated but instead may be in different rooms in the same building, different buildings on the same campus or at the same complex, in different cities or in different countries.

Upon receiving the request from origin device 320*a*, origin device 320*b* may retrieve the requested content segment and send it to origin device 320*a*. After receiving the content segment, the origin device 320*a* may send it to an output device such as a player or any other device. Additionally, in the event that the content segment sent by the origin device 320*b* to the origin device 320*a* is valid but has, for example, a different start time or duration than the start time or duration reflected in the Missing Content Segment message or 'miss,' the origin device 320*a* may return the correct start time or duration of the segment to the segment generator 320*a* (or its linear encoder 302*a*, segmenter 303*a*, etc.). The segment generator 300*a* (or its linear encoder 302*a*, segmenter 303*a*, etc.) may use, for example, the returned starting point as a starting point of its next 'miss' segment if there is still no input.

If the origin device 320*b* does not have the requested content segment, it may so notify the origin device 320*a*. The origin device 320*a* may request the missing segment from the origin device 320*c*, and the process described above may repeat. If the origin device 320*a* is unsuccessful in obtaining the missing content segment from another origin device 320*b, c*, then it may send a Missing Content Segment message or 'miss' to the output device. Additionally or alternatively, it may send a manifest indicating the missing content segment such as in, for example, an Apple HLS (HTTP Live Streaming) playlist file, Media Presentation Description (MPD) file, or any like data file, manifest, file, or packet.

There may be a desire to add identifiers to content segments. For example, when HLS content is created, there may be a desire to assign a sequence number to each segment. This may be expressed using the EXT-X-MEDIA-SEQUENCE (sec 4.4.3.2 of IETF RFC 8216). While it is possible to assign to rely on sequence of POST requests and assign sequence number N for Nth request, this may undesirably require state and depend on segmenter start-up time. In order to provide for deterministic numbering, the segment identifier may be carried in the segment itself. This can be achieved by embedding the segment identifier in the media segment. This can be done within an ISO-BMFF box located within the 'moof' box or in an 'emsg' message. In this way, when the identifier is received and parsed, the origin device 320 may use the value alone or together with the EXT-X-MEDIA-SEQUENCE tag in case of HLS, or in conjunction with the $Number$-based and $SubNumber$-based addressing for derivation of the values of within the SegmentTemplate@startNumber and SegmentTimeline elements such as the S@n attributes. Such segment identifier boxes may also signal that the corresponding segment is the last segment before a discontinuity occurs or the first segment after a discontinuity occurs.

Such a segment identifier may be a sequence number (for any movie fragment corresponding to a media segment or CMAF chunk) embedded in the segment. A process for creating and embedding sequence numbers (or segment identifiers in general) into a segment may be performed in the same fashion by segment generators 300*a-c* and, in this way, segments containing the same video content may include the same identifier (e.g., sequence number), regardless of where the segment is generated. Such coordination may promote synchronization between segment generators 300*a-c* and between origin devices 320*a-c*. For example, sequence numbering each segment of the plurality of segments sequentially may be performed such that the first segment that is to be viewed earlier than a second segment is associated with a lower sequence number than the second segment. A segment duration for each segment may be determined and the segments generated by accumulating sequential frames of the video content until a length of the sequential frames is equal to the segment duration. Once this occurs, a segment identifier (e.g., a sequence number), may be added to the accumulated frames sequentially.

Such segment identifiers or sequence numbers may be embedded in the segments for use by the origin device 320 and, optionally, the segment generator 300 but such identifiers or sequence numbers may or may not be included in segments sent to an output device such as a video player or any other device.

In another embodiment, when a specific content component is missing (e.g., no audio in a particular language), the segment generator may send a Missing Content Segment, 'miss', or the like with the same timing as valid segment of the same type (e.g., English audio), and additionally carry an indication that the component is currently absent. It may be carried as a brand (as described in ISO/IEC 14496-12), as an 'emsg' event, or as an indicator in a separate timed metadata track. In case the origin device outputs manifests, for example, in the Apple HTTP Live Streaming (HLS, defined in IETF RFC 8216) format, it may replace the missing segments with segments from a different content of the same type. For example, the playlist containing Spanish audio in absence of Spanish will reference the same English audio segments as the English playlist. Additionally, in case the origin device may be serving the master playlist while Spanish is missing, it may still reference a Spanish playlist in the master playlist. When there is a change in content characteristics (components go missing/are added, input resolution changes, etc.), a marker (e.g. an 'emsg' message or metadata included in the 'moof' box of the segment) may be sent to indicate a discontinuity.

For example, video content associated with programming may include, at the option of the output device, associated audio in either Spanish or English. If the output device, however, begins receiving content segments during an intermission in the program—such as during a commercial or advertisement intermission or during a breaking-news intermission or during any other intermission—such video content may be provided with only English as its associated audio. At the termination of such an intermission, however, the output device may not receive segments in Spanish because, for example, no manifest was created indicating that the program is being offered with either English or Spanish. To alert that Spanish is available for the program, a missing representation message may be sent during the intermission with false information that the video content is associated with Spanish but that Spanish is unavailable. In this way, the origin device 320 is "tricked" and may provide a manifest indicating that Spanish is available so that, when the intermission concludes and the program again proceeds, the origin device 320 will offer Spanish-related, as well as English-related URLs for the program.

This embodiment may be useful not only for audio in various languages but also, for example, video resolution, audio encoding (e.g., AC stereo, E-AC-3 or 4 multichannel), and subtitles. Additionally, such missing representation message may be included in a Missing Content Segment message such as, for example, such a message associated with the DASH protocol. Moreover, sending a missing representation message may include sending an Apple HTTP Live Streaming (HLS) manifest that include the missing representation message. Such a message may be sent by a segment generator 300 or a segmenter 303 to an origin device 320 and may be sent as part of an HLS manifest.

There may be many elements and attributes in a manifest such as a Media Presentation Description ("MPD"). Such a manifest may be an XML file that may represent different qualities of the media content and the individual segments of each quality with HTTP Uniform Resource Locators (URLs). This structure may provide binding of the segments to the bitrate (resolution, etc.) among others (e.g., start time, duration of segments). As a consequence, each client or video player or any other output device may first request an MPD that contains the temporal and structural information for the media content and based on that information it may request the individual segments that fit best for its requirements. But elements and attributes in a manifest such as an MPD may not be reflected in the segments. Such information may include average/peak bitrates, target segment duration, availability window (i.e., when is the client allowed to retrieve segments). In order to provide this information, a segment generator 300 or an encoder such as the linear encoder 302 may initiate a communication by posting a "protoMPD" (pMPD). The pMPD may be a valid MPD document with invalid URLs (i.e., URLs described in it do not need to exist, attributes such as @presentationTimeOffset, S@t, S@n, and SegmentTemplate@startNumber do not need to exist, there may be no MPD.Location element, etc.). If there is an MPD.Location element, the encoder may periodically send (via HTTP) a pMPD to the packager. If there is an MPD PatchLocation element, then the packager may send an MPD patch. It may describe all or part of the adaptation sets comprising the channel. In another embodiment the pMPD may only consist of a single XML element such as AdaptationSet (as defined in ISO/IEC 23009-1). On reception of this document from the segment generator 300 (e.g., from the VOD encoder 301, linear encoder 302, or segmenter 301), the origin device 320 may keep it and use it to generate the final MPD for the channel. Such final MPD may include information such as average/peak bitrates, segment duration, availability window, for use or implementation by an output device such as a player or any other output device.

Figure 5:
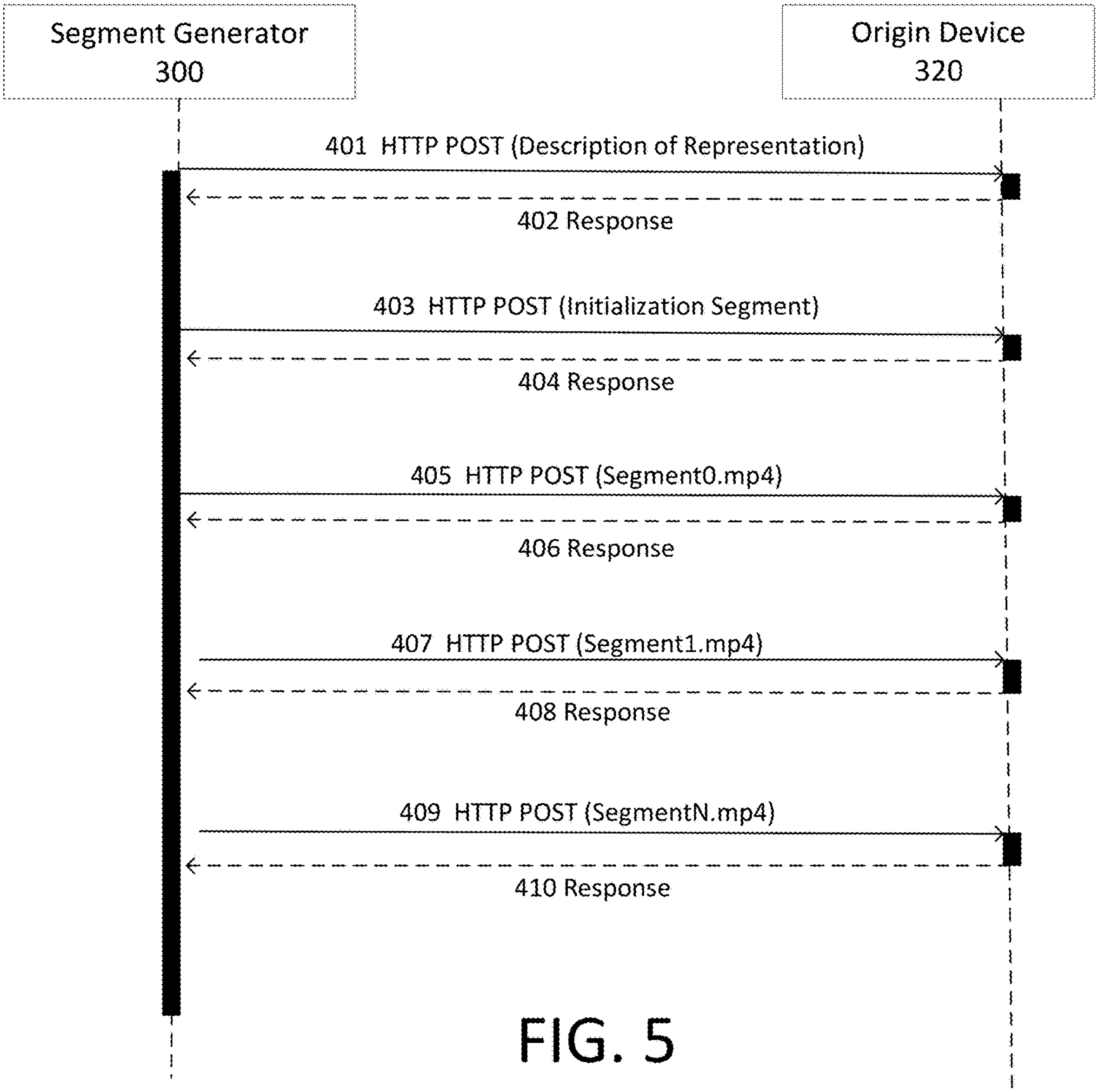
FIG. 5 shows an example data flow.

FIG. 5 illustrates a signaling diagram. The diagram represents, at a high and general level, example potential signaling associated with an ingest protocol between a segment generator 300 and an origin device 320. During the ingest protocol, the segment generator 300 may maintain a persistent HTTP connection. The signaling may commence with an HTTP POST (or PUT) 401 comprising a description of the representation (bitrate settings, target segment duration, etc.). The origin device 320 may respond at 402 with an acknowledgment message. The segment generator 300 may communicate an HTTP POST (or PUT) containing a pMPD describing the segments which would be further sent in this communication. The pMPD can include an initialization segment in it (for example, as a data URL). Unless included in the pMPD, the segment generator will issue an HTTP POST comprising an initialization segment at step 403. The origin device 320 may respond at 404 with, for example, an acknowledgment message. The segment general 300 may send a first segment 0 as part of an HTTP POST request at 405, and the origin device 320 may respond again at 406. This process may be repeated at step 407 with a next segment 1 as part of a HTTP POST message and a response at step 408. And the process may again repeat for subsequent segments until the final segment N is sent by the segment generator 300 to the origin device 320 at step 409, and a final response is returned at step 410. The segment generator may send an explicit termination message.

Figure 6:
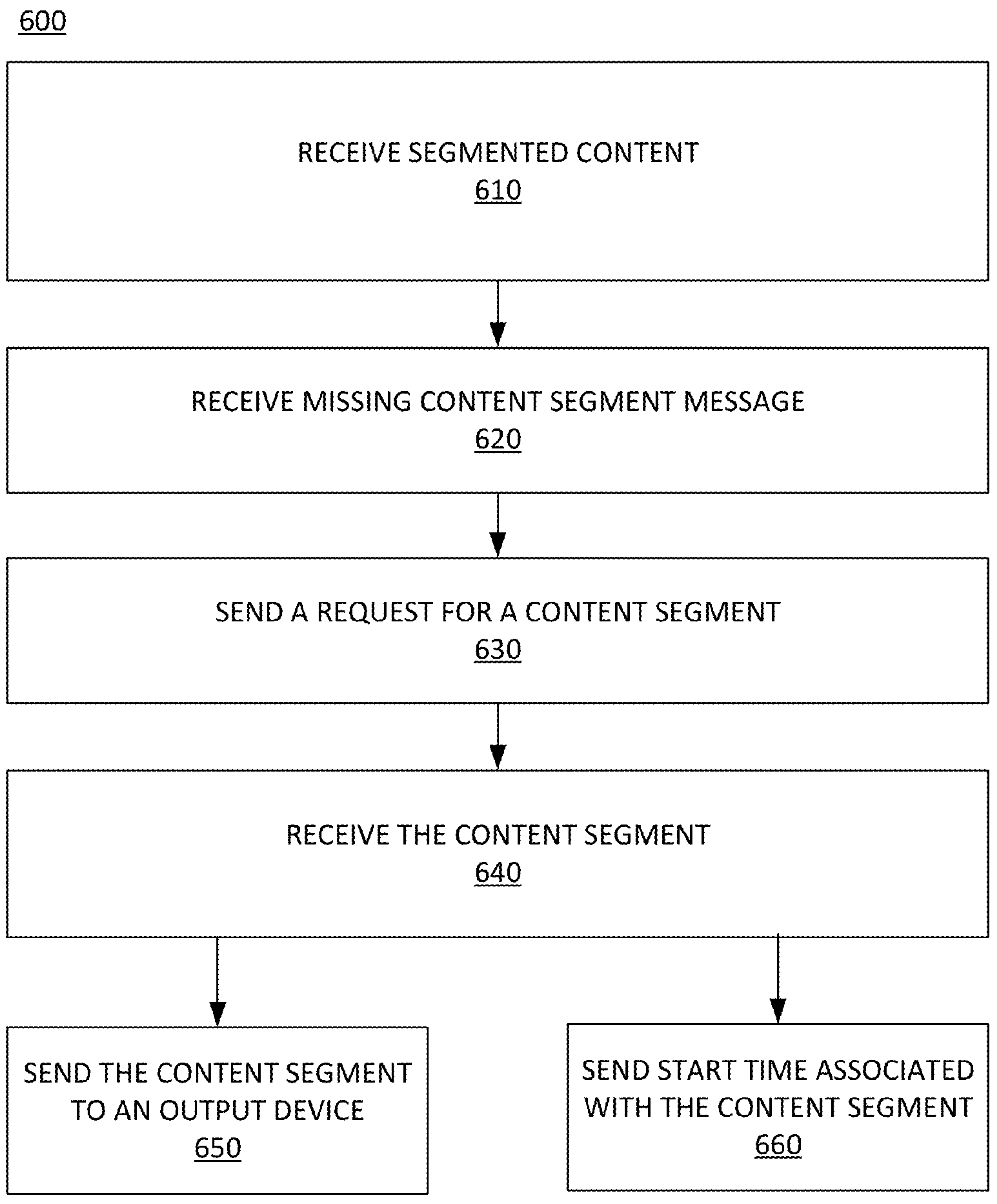
FIG. 6 shows an example method.

FIG. 6 illustrates a method 600. At step 610, segmented content may be received. Such content may be video content, such as linear, DVR recording, or video-on-demand content, or any other type of content. Such content may be any type of media such as video, audio, closed captioning, subtitles, other text, still images, thumbnails, as well as other associated metadata such as SCTE 35 messages, video quality metrics, etc., and the like. For purposes of description only, video content is referenced. Such reception may be performed by receiving an HTTP POST or HTTP PUT request. Such video content may be received by, for example, an origin device 320 from a segment generator 300 (and, specifically, a segmenter 303 of a segment generator 300). At step 620, a missing content segment message may be received. This message may also be received by the origin device 320 from a segment generator 300 (and specifically, may be received from an encoder 302 or segmenter 303). The missing content segment message may indicate that a segment of video content is missing and may further include, for example, a start time and duration associated with the missing content segment. The missing content segment message may be in the form of a Missing Content Segment message as defined in the DASH standard. At step 630, a request may be sent seeking the missing content segment. This request, for example, may be sent by an origin device 320*a* to another origin device 320*b* and may further include the start time and may further include the duration associated with the missing content segment.

At step 640, the missing content segment may be received. For example, the origin device 320*b* may send the requested missing content segment to the origin device 320*a*. At step 650, the content segment received at step 640 may be sent to an output device such as a video player or any other device. For example, the origin device 320*a* that received the missing content from the origin device 320*b* may send the segment to an output device. Additionally, at step 660, a start time associated with the missing content segment may be sent. For example, to the extent that the missing segment is associated with a start time or duration different from the start time or duration reflected in the missing content segment message received at step 620, the origin device 320*a* may send the different start time or duration to the segment generator 300 (e.g., to the segmenter 303 or encoder 302).

Figure 7:
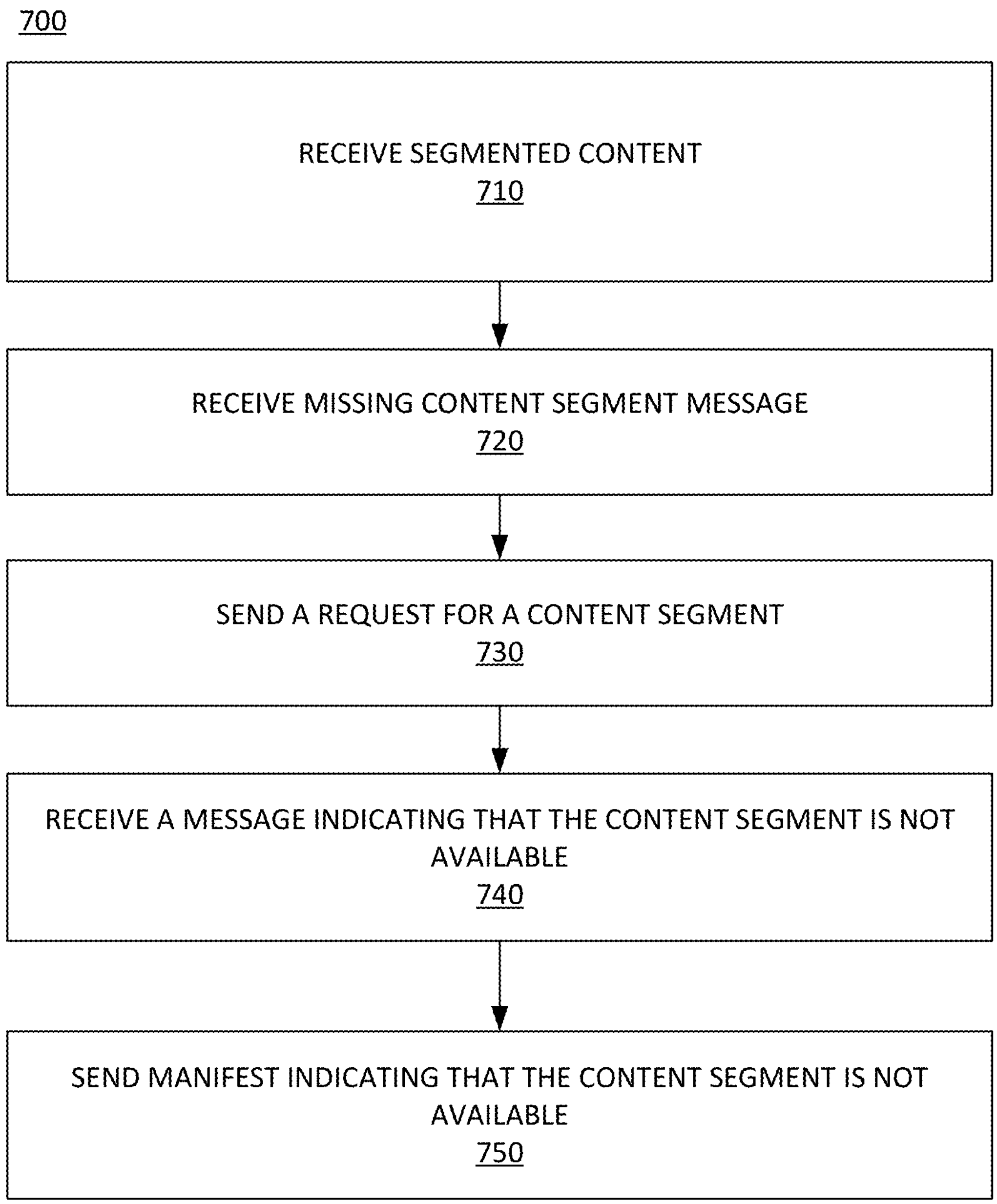
FIG. 7 shows an example method.

FIG. 7 illustrates a method 700. At step 710, segmented content may be received. Such content may be video content, linear video content, video-on-demand content, streaming video content, or any other type of content, including audio. Such content may be any type of media such as video, audio, closed captioning, subtitles, other text, still images, thumbnails, as well as other associated metadata such as SCTE 35 messages, video quality metrics, etc., and the like. For purposes of description only, video content is referenced. Such reception may be performed by receiving an HTTP POST request. Such video content may be received by, for example, an origin device 320 from a segment generator 300 (and, specifically, a segmenter 303 of a segment generator 300). At step 720, a missing content segment message may be received. This message may be received by the origin device 320 from a segment generator 300 (and specifically, may be received from an encoder 302 or segmenter 303). The missing content segment message may indicate that a segment of video content is missing and may further include, for example, a start time and duration associated with the missing content segment, as well as additional information carried in the Event Message Box ('emsg'). The missing content segment message may be in the form of a Missing Content Segment message as defined in the DASH standard. At step 730, a request may be sent seeking the missing content segment. This request, for example, may be sent by an origin device 320*a* to another origin device 320*b* and may further include the start time and may further include the duration associated with the missing content segment.

At step 740, a message may be received indicating that the content segment is not available. For example, the origin device 320*b* may send a message to the origin device 320*a* indicating that it does not have the requested missing content segment. At step 750, a manifest may be sent that indicates that the content segment is not available. For example, the origin device 320*a* may send a manifest to an output device such as a video player or any other device indicating that a segment of video content is missing.

Figure 8:
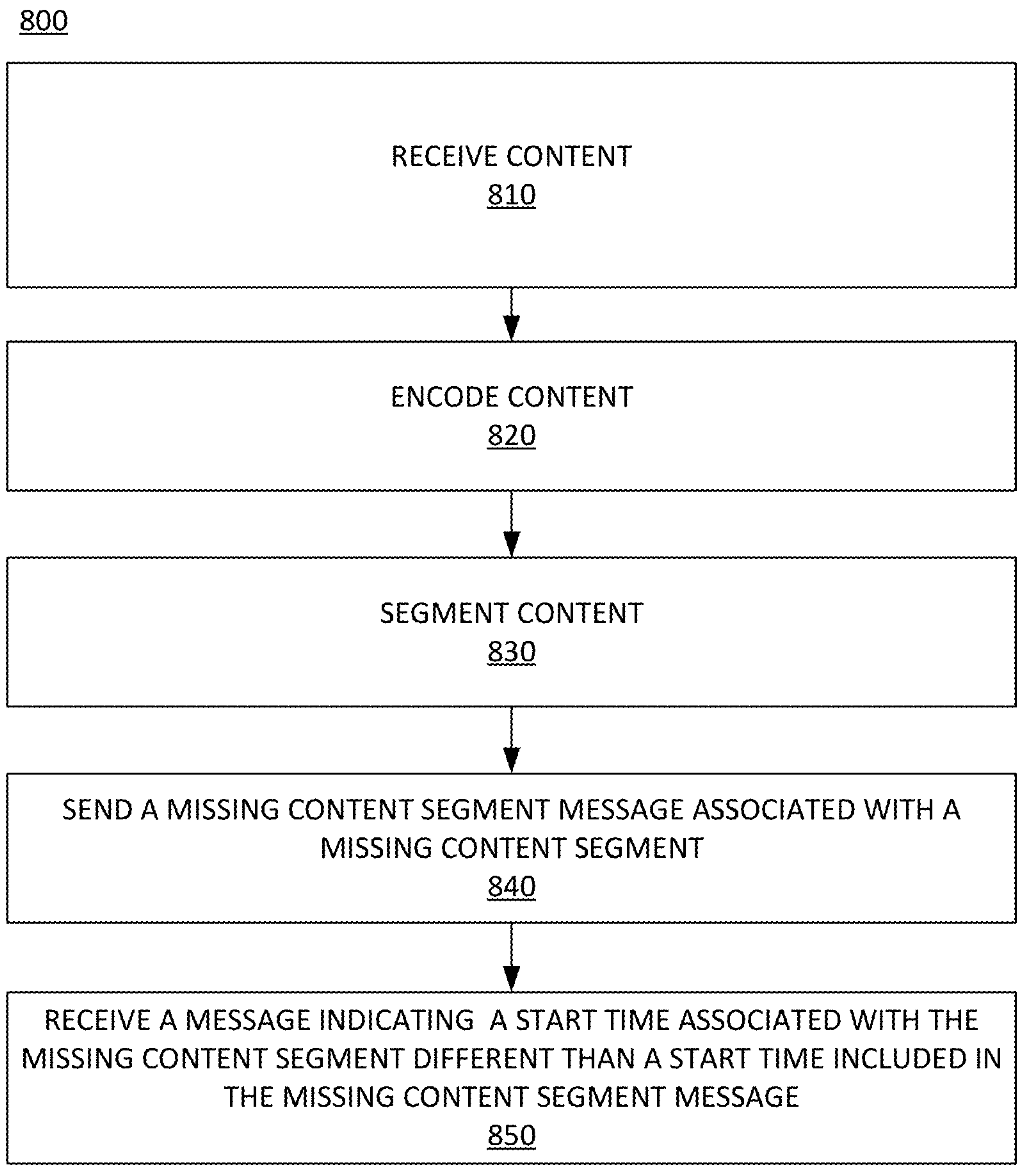
FIG. 8 shows am example method.

FIG. 8 illustrates a method 800. At step 810, content may be received at step 810. Such content may be video content, linear video content, video-on-demand content, streaming video content, or any other type of content, including audio. For purposes of description only, video content is referenced. Such video content may be received by, for example, a segment generator 300 (e.g., by an encoder 302). At step 820, the video content may be encoded. At step 830, the video content may be segmented. Such segmenter may be performed, for example, by the segmenter 303 of the segment generator 300. At step 840, a missing content segment message may be sent that is associated with a missing content segment. Such missing content segment message may be sent to, for example, an origin device 320. The missing content segment message may indicate that a segment of video content is missing and may further include, for example, a start time and duration associated with the missing content segment. The missing content segment message may be in the form of a Missing Content Segment message as defined in the DASH standard. At step 850, a message may be received indicating a start time associated with the missing content segment that is different from the start time that was included in the missing content segment message. For example, the origin device 320 may send a message to the segment generator 300 (e.g., to the segmenter 303 or the encoder 302) indicating that the missing segment has a start time or duration different from the start time or duration reflected in the missing content segment message.

Figure 9:
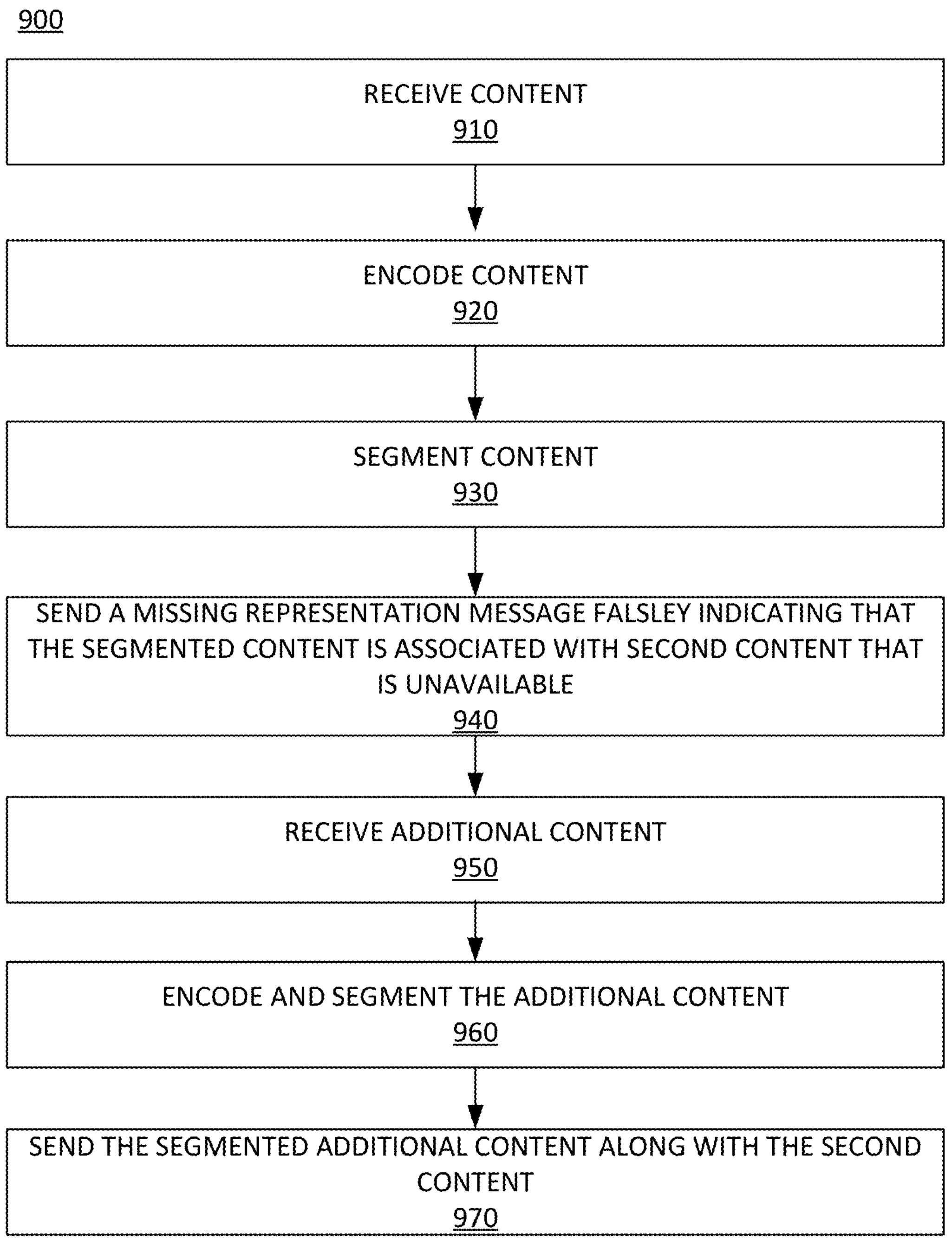
FIG. 9 shows an example method.

FIG. 9 illustrates a method 900. At step 910, content may be received. Such content may be video content, linear video content, video-on-demand content, streaming video content, or any other type of content, including audio. For purposes of description only, video content is referenced. Such content may be received, for example, at a segment generator 300. The video content may be encoded at step 920 (such as by an encoder 302) and segmented at step 930 (such as by a segmenter 303). At step 940, a missing representation message may be sent that falsely indicates that the segmented video content is associated with first content that is unavailable. For example, the video content may comprise audio content only in a first language (English) but the missing representation message may (intentionally) falsely indicate that the video content may comprise audio content in a second language (Spanish) that is unavailable. Of course, this is just one example. Another example may relate to encoding such that the audio associated with the video content is associated with an AC stereo encoding standard but the message may falsely indicate that the video content is also associated with an E-AC-3 or AC-4 multichannel audio encoding standard that is unavailable. Alternatively, the missing representation message may falsely indicate that the video content is associated with a different but unavailable resolution or different and unavailable subtitles. Such missing representation message may be included, for example, in a missing content segment message. Additionally, such a message may be sent, for example, within an HTTP Live Streaming manifest.

At step 950, additional video content may be received, such as a video program after an intermission. This additional content may be encoded and segmented at step 960. At step 970, the segmented video content may be sent along with content previously referenced as being unavailable.

Figure 10:
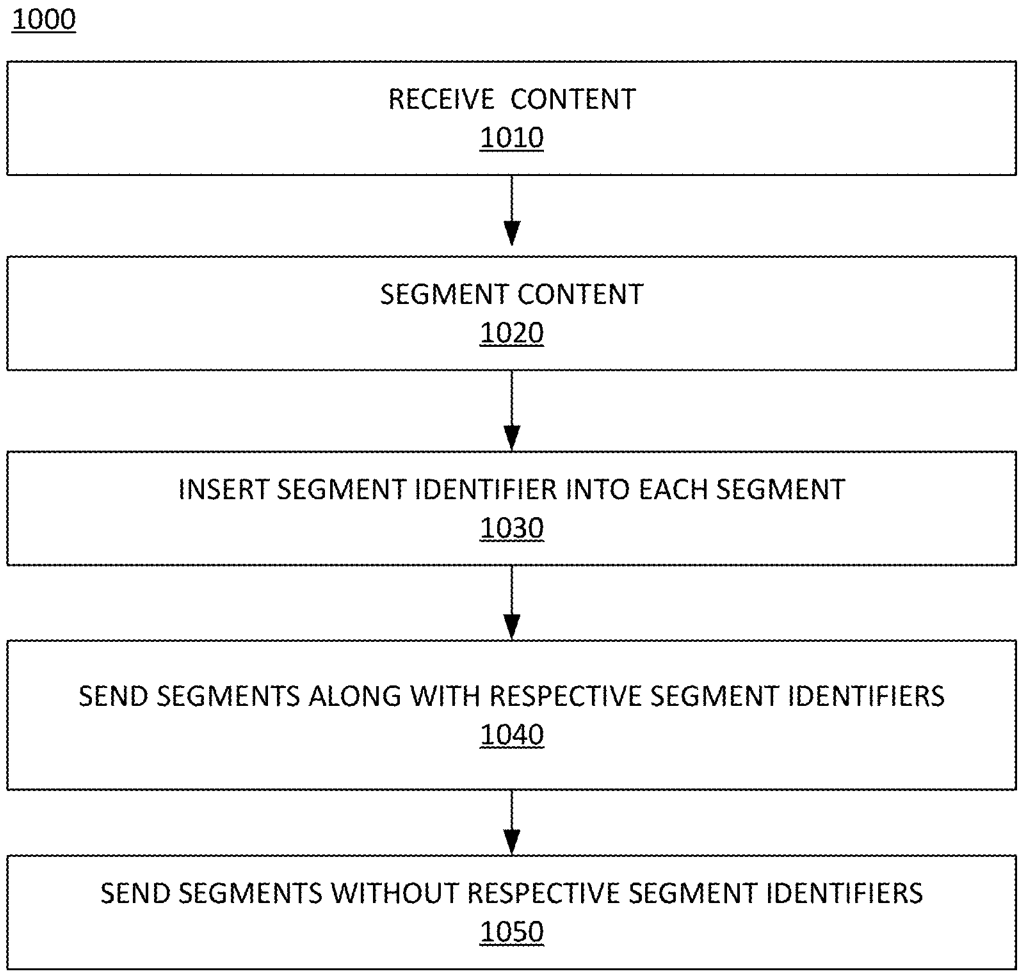
FIG. 10 shows an example method.

FIG. 10 illustrates a method 1000. At step 1010, content may be received. At step 1020, the video content may be segmented. Such content may be video content, linear video content, video-on-demand content, streaming video content, or any other type of content, including audio. For purposes of description only, video content is referenced. At step 1030, a segment identifier may be inserted into each segment. Such a segment identifier may be, for example, a sequence number though of course a segment identifier may be any data or information uniquely identifying a segment. Such segment identifiers may signify that the corresponding segment is the last segment before a discontinuity occurs or the first segment after a discontinuity occurs. Additionally, the segment identifiers associated with the segments may be generated independently at segment generators 300*a-c* or origin devices 320*a-c* and embedded in the respective segments such that the segment identifiers are the same for each segment of video data that has been generated. That is, the segments generated by a first segmenter 301*a* may include the same respective segment sequence number as the segments generated by a second segmenter 301*b*. Segment identifiers such as sequence numbers may be generated in any manner. For example, a segment duration for each segment may be determined. And each segment may be generated by accumulating sequential frames of the video content until a length of the sequential frames is equal to the segment duration. For each generated segment, the identifier may be inserted or embedded sequentially when the length of the accumulated frames becomes equal to the segment duration.

At step 1040, the segments containing a portion of video content along with the respective segment identifier may be sent. For example, the segments with the segment identifiers may be sent to an origin device 320. At step 1050, the segments may be sent to an output device such as a video player or any other device. The segments sent to the output device may or may not contain the segment identifier.

It is to be understood that the methods and systems described herein are not limited to specific methods, specific components, or to particular implementations. It is also to be understood that the terminology used herein is for the purpose of describing particular embodiments only and is not intended to be limiting.

As described, the methods and systems are concretely directed to improved content processing, provisioning, and playback. The methods and systems are directed to solving many problems associated with content segmenting and transmission as well as improve on such segmentation and transmission. The methods and systems address challenges in the event that segmented video is missing for at least a part of the time. The methods and systems leverage redundant or synchronous devices and provide for communication between such devices for multiple purposes including addressing the challenge of missing segmented video. Likewise, the methods and systems improve segmenter processing with notifications of errors or problems in the segmenting process such as incorrect start time and/or duration values. The methods and systems include improvements to identifying content segments through various forms or options for numbering or sequencing segments, all with a view to facilitating enhanced playback of content. The methods and systems furthermore improve communications between origin devices and output devices through, for example, provision of manifests providing information about segmented content such as missing segments. The methods and systems also provide improvements in meeting user needs or desires in terms of content associations. For example, the methods and systems provide a mechanism for playing audio content in a first language along with video content when a second language is also available. Such improvements can include sending false messages indicating that segmented video content is associated with a set of audio content but that the audio content is not available. As described herein, this enhances playback performance in, for example, Spanish even when video content is interrupted with commercials in English. Moreover, the systems and methods described herein are applicable across a number of standards associated with audio and video playback such as AVC, HEVC, VVC, LC-EVC, VP9, AV1 (video) as well as AAC, AC-3, E-AC-3 or AC-4 (audio), TTML, WebVTT (text), which are distributed using HTTP streaming standards such as, MPEG DASH, HTTP Live Streaming (HLS) and transported using protocols such as HTTP or ROUTE/DASH. Thus the methods and systems are directed to specific, technologic improvements in content provisioning and playback rooted in the computer field. Moreover, the methods and systems are directed to improving computer functionality for computers involved in content provisioning and playback, such as the computers shown in FIG. 1 and other figures.

As used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by use of the antecedent “about,” it will be understood that the particular value forms another embodiment. It will be further understood that the endpoints of each of the ranges are significant both in relation to the other endpoint, and independently of the other endpoint.

“Optional” or “optionally” means that the subsequently described event or circumstance may or may not occur, and that the description includes instances where said event or circumstance occurs and instances where it does not.

Throughout the description and claims of this specification, the word “comprise” and variations of the word, such as “comprising” and “comprises,” means “including but not limited to,” and is not intended to exclude, for example, other components, integers or steps. “Exemplary” means “an example of” and is not intended to convey an indication of a preferred or ideal embodiment. “Such as” is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:

receiving, by a first origin device at a first location, segmented first content comprising a plurality of content segments, wherein the first origin device is synchronized with a second origin device that received the segmented first content;

receiving, by the first origin device, a missing content segment message indicating that a first content segment is missing from the plurality of content segments, wherein the first content segment is associated with a portion of content missing from the segmented first content; and sending, by the first origin device to the second origin device, a request for the first content segment comprising at least a first start time associated with the first content segment; and receiving, by the first origin device, a second start time associated with the first content segment that is different than the first start time.

2. The method of claim 1, further comprising:

receiving, from the second origin device, the first content segment, wherein the first content segment is included in the segmented first content received by the second origin device; and sending the first content segment to an output device.

3. The method of claim 1, further comprising:

sending, to the second origin device, a request for a second content segment, wherein content associated with the second content segment is missing from the plurality of content segments; and receiving, from the second origin device, a message indicating that the second origin device does not comprise the second content segment.

4. The method of claim 3, further comprising:

sending a manifest to an output device comprising a message indicating that the second content segment is missing.

5. The method of claim 1, wherein the missing content segment comprises a Missing Content Segment as defined in the DASH standard.

6. The method of claim 1, further comprising:

sending, by the first origin device to a first segmenter device, the second start time.

7. The method of claim 1, wherein the first content is linear video content.

8. The method of claim 1, wherein the first origin device comprises an HTTP server.

9. The method of claim 1, wherein the first origin device comprises a server implementing the Route Protocol.

10. The method of claim 1, wherein the second origin device is at a second location different from the first location.

11. A method comprising:

receiving, by a first segmenter device located at a first location, first content;

segmenting the first content into a plurality of content segments;

sending, to a first origin device, the plurality of content segments;

sending, to the first origin device, a missing content segment message, wherein the missing content segment message indicates that a first content segment is missing from the plurality of content segments, wherein the first content segment is associated with a portion of content missing from the first content, and wherein the message further indicates a first start time associated with the first content segment;

receiving from the first origin device a second message indicating a second start time associated with the first content segment different from the first start time.

12. The method of claim 11, wherein the missing content segment message comprises a Missing Content Segment message associated with a DASH protocol.

13. The method of claim 11, wherein a second plurality of content segments received by a second origin device included the first content segment comprising the second start time.

14. The method of claim 11, further comprising:

inserting, by the first segmenter device, a segment identifier into each content segment of the plurality of content segments.

15. The method of claim 14, wherein a second segmenter device segmented the first content into a second plurality of second content segments and inserted, into each second content segment, a second segment identifier, and wherein each second segment identifier corresponds to the segment identifier inserted into each content segment by the first segmenter device.

16. The method of claim 14, further comprising:

determining a segment duration for each content segment of the plurality of content segments;

generating each content segment of the plurality of content segments by accumulating sequential frames of the first content until a length of the sequential frames is equal to the segment duration;

inserting the segment identifier to the accumulated frames sequentially when the length of the accumulated frames becomes equal to the segment duration.

17. A method comprising:

receiving, by a first origin device at a first location, segmented first content comprising a plurality of content segments, wherein the first origin device is synchronized with a second origin device that also received segmented first content;

receiving, by the first origin device from the second origin device, a request for a first content segment of the plurality of content segments, wherein the request comprises a first start time and duration associated with the first content segment; and sending, by the first origin device to the second origin device, the first content segment and an indication that the first content segment is associated with a second start time different from the first start time.

18. The method of claim 17, wherein the first origin device is redundant of the second origin device.

19. The method of claim 17, further comprising:

receiving, by the first origin device, a missing content segment message indicating that a second content segment is missing from the plurality of content segments, wherein the second content segment is associated with a portion of content missing from the segmented first content; and sending, by the first origin device to the second origin device, a request for the second content segment.

* * * * *